United States Patent
Chen et al.

(10) Patent No.: US 10,156,442 B2
(45) Date of Patent: Dec. 18, 2018

(54) FABRY-PEROT(F-P) SENSOR FOR MEASURING AN INCLINATION

(71) Applicant: Yizheng Chen, Jilin (CN)

(72) Inventors: Yizheng Chen, Jilin (CN); Yan Tang, Jilin (CN); Yongji Wu, Jilin (CN); Zhengang Lu, Jilin (CN); Jie Huang, Jilin (CN); Jing Guo, Jilin (CN); Changlin Chen, Jilin (CN)

(73) Assignee: Yizheng Chen, Jilin (CN)

( * ) Notice: Subject to any disclaimer, the term of this patent is extended or adjusted under 35 U.S.C. 154(b) by 0 days.

(21) Appl. No.: 15/342,461

(22) Filed: Nov. 3, 2016

(65) Prior Publication Data

US 2017/0219343 A1    Aug. 3, 2017

(30) Foreign Application Priority Data

Feb. 1, 2016    (CN) .......................... 2016 1 0066881

(51) Int. Cl.

| G01C 9/04 | (2006.01) |
|---|---|
| G01B 9/02 | (2006.01) |
| G01B 11/26 | (2006.01) |
| G01D 5/353 | (2006.01) |
| G02F 1/21 | (2006.01) |
| G01C 9/06 | (2006.01) |

(52) U.S. Cl.
CPC .......... *G01C 9/04* (2013.01); *G01B 9/02049* (2013.01); *G01B 11/26* (2013.01); *G01D 5/35312* (2013.01); *G01C 2009/066* (2013.01); *G02F 2001/213* (2013.01)

(58) Field of Classification Search
CPC .......... G01S 17/50; G01V 7/005–7/12; G01C 9/04; G01C 2009/066; G01C 9/00; G01C 9/02; G01D 5/35312; G01D 5/353; G01B 11/26; G01B 9/02049
See application file for complete search history.

(56) References Cited

U.S. PATENT DOCUMENTS

| 4,322,829 A * | 3/1982 | Davis, Jr. ............... G01V 1/181 |
|---|---|---|
| | | 359/900 |
| 5,011,279 A | 4/1991 | Auweter et al. |
| 5,425,179 A | 6/1995 | Nickel et al. |
| 5,428,219 A | 6/1995 | Cwalinski |

(Continued)

FOREIGN PATENT DOCUMENTS

WO   WO2015/042686   *   4/2015   ............. G01P 15/03

*Primary Examiner* — Michael P Lapage
(74) *Attorney, Agent, or Firm* — Gokalp Bayramoglu

(57) ABSTRACT

A Fabry-Perot sensor for measuring an inclination. The sensor is fixed on a static detected object, where a mass block is flexibly connected to a top plate, thus the line between the center of gravity of the mass block and the connecting point on the top plate is perpendicular to the horizontal plane. This creates a Fabry-Perot cavity between a reflecting surface disposed at one end of the mass block and the end of an optic fiber. When the detected object is tilted, the line between the center of gravity of the mass block and its connecting point on the top plate remains perpendicular and the F-P cavity length will have a variation in length. The change of cavity length is measured in accordance with the Fabry-Perot principle, thereby the tilting angle, which is the inclination of the detected object, of the mass block is measured.

13 Claims, 8 Drawing Sheets

(56) References Cited

U.S. PATENT DOCUMENTS

| | | | |
|---|---|---|---|
| 6,140,635 A | 10/2000 | Kazumi et al. | |
| 6,204,498 B1 | 3/2001 | Kumagai et al. | |
| 7,038,150 B1 * | 5/2006 | Polosky | H01H 1/0036 |
| | | | 200/61.45 M |
| 7,319,514 B2 | 1/2008 | Ritchie et al. | |
| 7,719,690 B2 | 5/2010 | Childers et al. | |
| 7,882,923 B2 | 2/2011 | Yamamoto et al. | |
| 2006/0139626 A1 * | 6/2006 | Childers | G01C 9/06 |
| | | | 356/138 |
| 2010/0046002 A1 * | 2/2010 | Perez | G01H 9/00 |
| | | | 356/478 |
| 2012/0050735 A1 * | 3/2012 | Higgins | G01L 1/24 |
| | | | 356/326 |
| 2015/0204899 A1 * | 7/2015 | Salit | G01P 15/093 |
| | | | 73/514.26 |
| 2016/0202284 A1 * | 7/2016 | Paquet | G01P 13/00 |
| | | | 73/514.26 |

\* cited by examiner

FABRY-PEROT(F-P) SENSOR FOR MEASURING AN INCLINATION

FIELD OF THE INVENTION

The invention relates to the field of sensors and more particularly to a Fabry-Perot (F-P) sensor.

BACKGROUND OF THE INVENTION

In the prior art, some electric sensors and FBG sensors are available for measuring the inclination. However, the range of FBG sensor generally could reach up to about 5 degrees, which is a lower accuracy in the order of minutes. Also these sensors were based on the effect of strain on the inclination which is involved with the issue of the resistance and lead to the considerable reducing of the measuring sensitivity and accuracy. Thereby a sensor with characteristics of long duration, high accuracy, no-wear and non-contact is needed to achieve the measuring function. The sensor in present invention is a Fabry-Perot sensor using the non-contact feature between optic fiber and reflecting surface to measure the inclination with quite high accuracy.

CONTENT OF THE INVENTION

In order to solve the foregoing technical problems, the invention provides a Fabry-Perot sensor for measuring inclination. Wherein the present inclinometer is fixed on a static detected object in application use, the mass block is flexibly connected to the top plate, thus the line between the center of gravity of the mass block and the connecting point on the top plate is perpendicular to the horizontal plane; a Fabry-Perot cavity is formed between the reflecting surface disposed at one end of the mass block and the end of the optic fiber. The detected object will be in a static state after tilting, the line between the center of gravity of the mass block and its connecting point on the top plate is still perpendicular to the level plane and the F-P cavity length will have a variation. Then the change of cavity length can be measured in accordance with the Fabry-Perot principle, thereby the tilting angle of the mass block is able to be further measured. Then the tilting angle is also the inclination of the detected object. The sensor provided in present invention has advantages such as simplicity, convenience and high precision and has wide application prospective.

In order to achieve the foregoing objects, the technical scheme of present invention is as follows.

The invention provides a Fabry-Perot sensor comprising a top plate, a mass block, the first connector and the first optic fiber, wherein:

the top of said mass block is flexibly connected to the top plate and the first reflecting surface is disposed at one side of the mass block;

one end of the first connector is rigidly connected to the top plate and the other end is fixedly connected to the first optic fiber; the end of the first fiber provided with the first reflecting end face is directly facing to the first reflecting surface, thus the first F-P cavity is formed between the first reflecting surface and the first reflecting end face, when the inclinometer has an inclination, the top plate will slant with it and further drive the first connector to have tilt, and the first reflecting end face will move and rotate, but the mass block will maintain the original position and just has rotation, thus the first F-P cavity length will experience change; therefore, the variation of the first F-P cavity length can be employed to measure the tilting angle of the inclinometer.

Preferably, said mass block is a horizontal rod connected to the top plate by $N_1$ flexible ropes with equal length; the distance between two connected points of any two flexible ropes connected to top plate is designated as the first distance; the distance between two connected points of the said two flexible ropes connected to the horizontal rod is designated as the second distance; the first distance is equal to the second distance;

when the top plate is horizontally placed, the horizontal rod is also in horizontal position with the first reflecting surface arranged vertically; the center of gravity of the horizontal rod is in the envelop range of $N_1$ flexible ropes with equivalent length. Also the first reflecting surface is perpendicular to the axis of the first fiber; $N_1$ is an integral number greater than or equal to two.

Preferably, $N_1=2$.

Preferably, two flexible ropes have equal length; the distance between two connected points of two flexible ropes connected to the top plate is designated as the first distance; the distance between two connected points of said two flexible ropes connected to the horizontal rod is designated as the second distance; the first distance is equal to the second distance.

Preferably, the first connector is a vertical rod rigidly connected to top plate.

Preferably, said mass block is a horizontal rod flexibly connected to the top plate by $N_2$ rigid rods with equal length; the rigid rods also have flexible connection to the horizontal rod; when the inclinometer tilts, the rigid rods will permanently be in the vertical position;

also the distance between two connected points of any two rods connected to the top plate is designated as the third distance; the distance between two connected points of said two rods connected to the horizontal rod is designated as the fourth distance; the third distance is equal to the fourth distance;

when the top plate is arranged horizontally, the horizontal rod is also in horizontal position with the first reflecting surface disposed vertically; also the first reflecting surface is perpendicular to the axis of the first fiber. $N_2$ is an integral number greater than or equal to two.

Preferably, $N_2=2$.

Preferably, two rigid rods have equal length; the distance between two connected points of two rigid rods connected to the top plate is designated as the third distance; the distance between two connected points of said two rigid rods connected to the horizontal rod is designated as the fourth distance; the third distance is equal to the fourth distance.

Preferably, said first connector is vertical rod a rigidly connected to top plate.

The invention provides a Fabry-Perot (F-P) sensor, comprising a top plate, a mass block, the first connector, the first optic fiber, the second connector and the second optic fiber, is characterized in that:

the mass block is flexibly connected to the top plate; the first reflecting surface and the second reflecting surface are disposed at the two sides of the mass block, respectively; the first reflecting surface and the second reflecting surface have an angle $\alpha$ and $\alpha \neq 0°$; the top end of the first connector is rigidly connected to the top plate and bottom end is fixedly connected to the first optic fiber; the end of the first fiber disposed with the first reflecting end face is directly facing to the first reflecting surface; the first F-P cavity is formed between the first reflecting surface and the first reflecting end face; when the inclinometer has an inclination in the vertical plane formed by the first connector and the first optic fiber, the top plate will slant with it and further drive the first connector to have tilt, the first reflecting end face will move and rotate, but the mass block will maintain the original position and just has rotation, thus the first F-P cavity length will experience changes;

the top end of the second connector is rigidly connected to the top plate and the bottom end is fixedly connected to the second optic fiber; the end of the second fiber provided with the second reflecting surface is directly facing to the second reflecting surface; the second F-P cavity is formed between the second reflecting surface and the second reflecting end face; when the inclinometer tilts in the vertical plane formed by the second connector and the second optic fiber, the top plate will slant with it and further followed by the inclination of the second connector; however, the mass block will be in the original position and just has rotation, thus the second F-P cavity length will be changed.

Preferably, the mass block is a regular column with polygon cross section; the first reflecting surface and the second reflecting surface is located at two sides of the column, respectively, the upper surface of the column is connected to the top plate by $N_5$ flexible ropes in equal length and their connecting points are not in a straight line; and the four connecting points of any two flexible ropes connected to top plate and connected to the regular column constitute a parallelogram; the center of gravity of the regular column is in the envelop range of the intersection of $N_5$ flexible ropes with equal length and the regular column, wherein $N_5$ is an integral number greater than or equal to three;

when the top plate is horizontally placed, the top surface of the regular column is also in a horizontal position with the first reflecting surface arranged vertically; also the first reflecting surface is perpendicular to the axis of the fiber; the second reflecting surface is also in vertical position and is perpendicular to the axis of the second fiber.

Preferably, $N_5=3$ and $\alpha=90°$, the three connecting points of flexible ropes connected to the top plate form a right triangle with two right angle sides parallel to the first and the second reflecting surface, respectively; when the top plate is horizontally placed, the first and the second reflecting surface are normal to the horizontal plane.

Preferably, the mass block is a regular column with polygon cross section; the first reflecting surface and the second reflecting surface is located in two sides of the regular column, respectively; the upper surface of the column is flexibly connected to the top plate by $N_6$ rigid rods with equal length and bottom surface has a flexible connection with the mass block; thus when the inclinometer has inclination, the rigid rods will always in vertical position.

the connecting points of the $N_6$ rigid rods and the top plate are not in a straight line; and the four connecting points of any two rigid rods connected to top plate and connected to the upper surface of column constitute a parallelogram, in which $N_6$ is an integral number greater than or equal to three.

when the top plate is horizontally placed, the top surface of the regular column is also in a horizontal position with the first reflecting surface arranged vertically; also the first reflecting surface is perpendicular to the axis of the optic fiber; the second reflecting surface is also in vertical position and is perpendicular to the axis of the second fiber.

Preferably, $N_5=3$ and $\alpha=90°$, the three connecting points of rigid rods connected to the mass block form a right triangle with two right angle sides parallel to the first and the second reflecting surface, respectively; when the top plate is horizontally placed, the first and the second reflecting surface are normal to the horizontal plane.

Preferably, both the first and the second connector are vertical rods rigidly connected to top plate.

Preferably, the mass block is a cuboid with $N_5=4$ and four flexible ropes or four rigid rods in equal length are flexibly connected to the four vertices of the upper surface of the cuboid.

Preferably, said mass block is a thin slice connected to the top plate by $N_3$ flexible ropes in equal length; the first reflecting surface is provided at one side of the thin slice; when the top plate is arranged horizontally, the first reflecting surface is in vertical position and is perpendicular to the axis of the first optic fiber; the center of mass of the thin slice is in the envelop range of $N_3$ flexible ropes with equivalent length and $N_3$ is an integral number greater than or equal to two.

Preferably, $N_3=2$.

Preferably, two ends of thin slice are connected to the top plate by two flexible ropes with equal length.

Preferably, said first connector is a vertical rod rigidly connected to top plate.

Preferably, the length of $N_3$ flexible ropes is equal.

Preferably, said the mass block is a thin slice with its top flexibly connected to the top plate by using $N_4$ rigid rods with equal length; the rigid rods are also flexibly jointed the thin slice; when the inclinometer tilts, the rigid rods will be permanently in the vertical position;

the first reflecting surface is disposed at one side of the thin slice; when the top plate is horizontally placed, the first reflecting surface is in vertical position and is perpendicular to the axis of the first optic fiber; $N_4$ is an integral number greater than or equal to two.

Preferably, $N_4=2$.

Preferably, two ends of thin slice are flexibly connected to the top plate by two rigid rods with equal length.

Preferably, the first connector is a vertical rod rigidly connected to the top plate.

Preferably, the length of $N_4$ rigid rods is equal.

Preferably, the mass block is a horizontal rod connected to the top plate by $N_5$ flexible ropes with equal length;

the distance between two connected points of any two flexible ropes connected to the top plate is designated as the fifth distance; the distance between two connected points of the said two flexible ropes connected to the horizontal rod is designated as the sixth distance; the fifth distance is equal to the sixth distance;

the first reflecting surface is located at the upper surface of the horizontal rod; when the top plate is in horizontal position, the horizontal rod is also in level condition and the first reflecting surface is aligned in level direction; the center of mass of the horizontal rod is in the envelop range of $N_5$ flexible ropes with equivalent length; also the first reflecting surface is perpendicular to the axis of the first optic fiber; $N_5$ is an integral number greater than or equal to two.

Preferably, $N_5=2$.

Preferably, two flexible ropes have equal length; the distance between two connected points of two flexible ropes connected to the top plate is designated as the fifth distance; the distance between two connected points of said two flexible ropes connected to the horizontal rod is designated as the sixth distance; the fifth distance is equal to the sixth distance.

Preferably, the first connector is a vertical rod rigidly connected to the top plate.

Preferably, the mass block is a horizontal rod flexibly connected to the top plate by $N_6$ rigid rods in equal length; the rigid rods also have the flexible connection with the horizontal rod; when the inclinometer tilts, the rigid rods will permanently be in a vertical condition;

also the distance between two connected points of any two rods connected to the top plate is designated as the third distance; the distance between two connected points of the said two rods connected to the horizontal rod is designated as the fourth distance; the third distance is equal to the fourth distance;

the first reflecting surface is located at the upper surface of the horizontal rod; when the top plate is in horizontal position, the horizontal rod is also in level condition and the first reflecting surface is parallel with the horizontal plane; also the first reflecting surface is perpendicular to the first axis of the first optic fiber; $N_6$ is an integral number greater than or equal to two.

Preferably, $N_6=2$.

Preferably, two rigid rods are flexibly connected to the horizontal rod and top plate, respectively.

Preferably, the first connector is a vertical rod rigidly connected to the top plate.

Preferably, the mass block is a regular column with polygon cross section; the first reflecting surface and the second reflecting surface is disposed at the top surface of the regular column; the upper surface of the column is connected to the top plate by $N_7$ flexible ropes in equal length and their connecting points are not in a straight line; and the four connecting points of any two flexible ropes connected to top plate and connected to the regular column form a parallelogram; the center of mass of the column is in the envelop range of the intersection of $N_7$ flexible ropes with equal length and regular column, wherein $N_7$ is an integral number greater or equal to three.

Preferably, when the top plate is placed horizontally, the top surface of the regular column is also in a horizontal position with the first reflecting surface arranged in level; also the first reflecting surface is perpendicular to the axis of the fiber; the second reflecting surface is also in horizontal position and is perpendicular to the axis of the second fiber.

Preferably, the mass block is a regular column with polygon cross section; the first reflecting surface and the second reflecting surface are provided at the upper surface; the upper surface of the column is flexibly connected to the top plate by $N_8$ rigid rods in equal length and the rigid rods is also flexibly jointed the mass block; thus when the inclinometer has inclination, the rigid rods will permanently keep a vertical position; and $N_8$ is a integral number greater than or equal to three;

when the top plate is disposed horizontally, the top surface of the regular column is also in a horizontal position with the first reflecting surface arranged in level; also the first reflecting surface is perpendicular to the axis of the fiber; the second reflecting surface is also in horizontal position and is perpendicular to the axis of the second fiber.

Preferably, both the first and second connector are vertical rods rigidly connected to the top plate.

The beneficial effects of the present invention are as follows:

(1) The invention elegantly combines the principle of the EFPI and mechanical designing. The tilting angles of the detected object can be transformed into the variation of the cavity length of EFPI sensor by adopting simple EFPI structure. The invention not only can be designed to have different ranges through the length of the ropes, but also can measure the inclination of single or double tilting.

(2) The present invention has extremely high accuracy and merely no effect from temperature. Since there is not any resistance during tilting, factors disturbed the inclination are not existed. The accuracy can reach up to the order of 0.001" and even can ensure it to 0.03" at the temperature of 50 degree. The present sensor also completely has no electromagnetic interference, and has the advantage of being applied to conduct the long-term monitoring at sites with large temperature difference and severe conditions, thus has very strong practicality.

(3) The present invention has a superiority of non-wear as a result of the non-contact between reflecting surface and reflecting end surface, thus has a particularly long service life.

(4) If the requirement on the accuracy is extremely high, the measuring accuracy can be improved by utilizing temperature compensation which is realized through a FBG and the entire system is also a optic fiber which is convenient for analyzing the displacement and temperature from a spectrum.

DETAILED DESCRIPTION OF THE PREFERRED EMBODIMENTS

Figure 1:
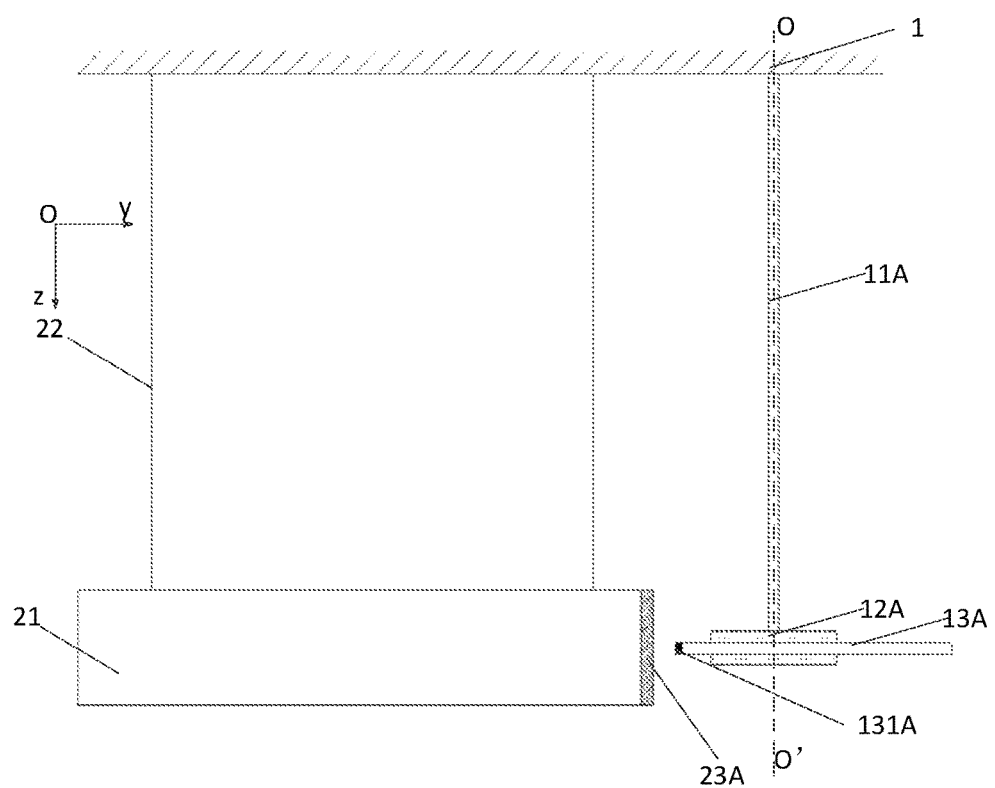
FIG. 1 is a front view of an Fabry-Perot sensor provided in embodiment 1 of the invention

Following the present invention is a step for further detailed description in conjunction with the detailed description of the embodiments.

Embodiment 1

A Fabry-Perot (F-P) sensor provided in the present embodiment is comprising of a top plate 1, a mass block 21, the first connector 11A and the first optic fiber 13A, wherein: the top of said mass block 21 is flexibly connected to the top plate 1 and the first reflecting surface 23A is disposed at one side of the mass block 21;

one end of the first connector 11A is rigidly connected to the top plate 1 and the other end is fixedly connected to the first optic fiber 13A; the end of the first fiber 13A provided with the first reflecting end face 131A is directly facing to the first reflecting surface 23A, thus the first F-P cavity is formed between the first reflecting surface 23A and the first reflecting end face 131A, when the inclinometer has an inclination, the top plate 1 will slant with it and further drive the first connector 11A to have tilt, and the first reflecting end face 131A will move and rotate, but the mass block 21 will maintain the original position and just has rotation, thus the first F-P cavity length will experience change; therefore, the variation of the first F-P cavity length can be employed to measure the tilting angle of the inclinometer.

In practical use of the present inclinometer, for instance, when measuring the inclination of a construction, the inclinometer should be fixed on the construction and the top plate should be kept horizontally. The mass block will be in a static position after installation because of the flexible connection of the top of the mass block to the top plate. Then disposing an axis designated as OO' perpendicular to the level plane for the first connector and designating the first Fabry-Perot length as d, when the construction occurred the tilting, the inclinometer would tilt as well as the inclination of the top plate and the first connector, thus the angle between the axis OO' of the first connector and the gravity line will be the tilting angle of the construction and the first Fabry-Perot length changes to d'. Then the variation of the cavity length Δd=d'−d can be calculated by employing the Fabry-Perot principle and further obtain the inclination angle of θ occurred on the first connector, namely, the inclination of the object (construction).

Optionally, the first optic fiber 13A can be single or multi-mode fiber.

Optionally, the first reflecting surface 23A can be replaced with a reflector.

Optionally, the first connector 11A is a vertical rod rigidly connected to the top plate 1.

Optionally, the first optic fiber 13A is connected to the first connector 11A through the first fiber housing 12A disposed at the periphery of the first fiber.

Optionally, the top plate can be made by using the material with minimum thermal expansion coefficient such as quartz glass.

The shape of the vertical rod can be very thin and can adopt the material with high stiffness to fabricate such as the carbon fiber or quartz glass. The bottom of the connector can be provided with the horizontal hole or horizontal tube with hole which can fix the housing of the optic fiber. In the process of fixing the fiber, a short part of thin tube can first pass through the horizontal tube of the connector and place the fiber through the center thin hole of the thin tube.

Optionally, the inclinometer can have a packaging housing.

The disposing of the packaging housing can protect the inside sensor, can be dust and water vapor proof, and can be provided with a fixture for fixing the sensor on an object to be tested.

The Fabry-Perot sensor provided in present embodiment can be located in a sealed container with liquid filled in the whole container as a damp to eliminate the disturbance from the structure vibration.

The Fabry-Perot sensor provided in present embodiment can be located in a sealed container with a liquid damper disposed at the bottom of the mass block to eliminate the effect from the structure vibration on the mass block.

Embodiment 2

The present embodiment has some improvements on the basis of embodiment 1, the improved contents are as follows specifically:

The mass block 21 is a horizontal rod connected to the top plate by $N_1$ flexible ropes 22 with equal length;

the distance between two connected points of any two flexible ropes 22 connected to top plate 1 is designated as the first distance; the distance between two connected points of the said two flexible ropes 22 connected to the horizontal rod is designated as the second distance; the first distance is equal to the second distance;

when the top plate 1 is horizontally placed, the horizontal rod is also in horizontal position with the first reflecting surface 23A arranged vertically; the center of gravity of the horizontal rod is in the envelop range of $N_1$ flexible ropes 22 with equivalent length. Also the first reflecting surface 23A is perpendicular to the axis of the first fiber 13A; $N_1$ is an integral number greater than or equal to two.

The center of gravity of the horizontal rod being in the range of $N_1$ flexible ropes prevents the shaking of the horizontal rod whenever the flexible ropes exerts forces on horizontal rod, namely, the first reflecting surface will always directly face to the first reflecting end face.

In practical use, the inclinometer should be fixed on the detected object and the top plate needs to be in horizontal position. As shown in FIG. 1, taking point O as the center of plane YOZ, the inclinometer can measure the rotation of detected object in YOZ plane relative to point O.

The working principle of the Fabry-Perot sensor provided in the present embodiment is described as follows.

Figure 2:
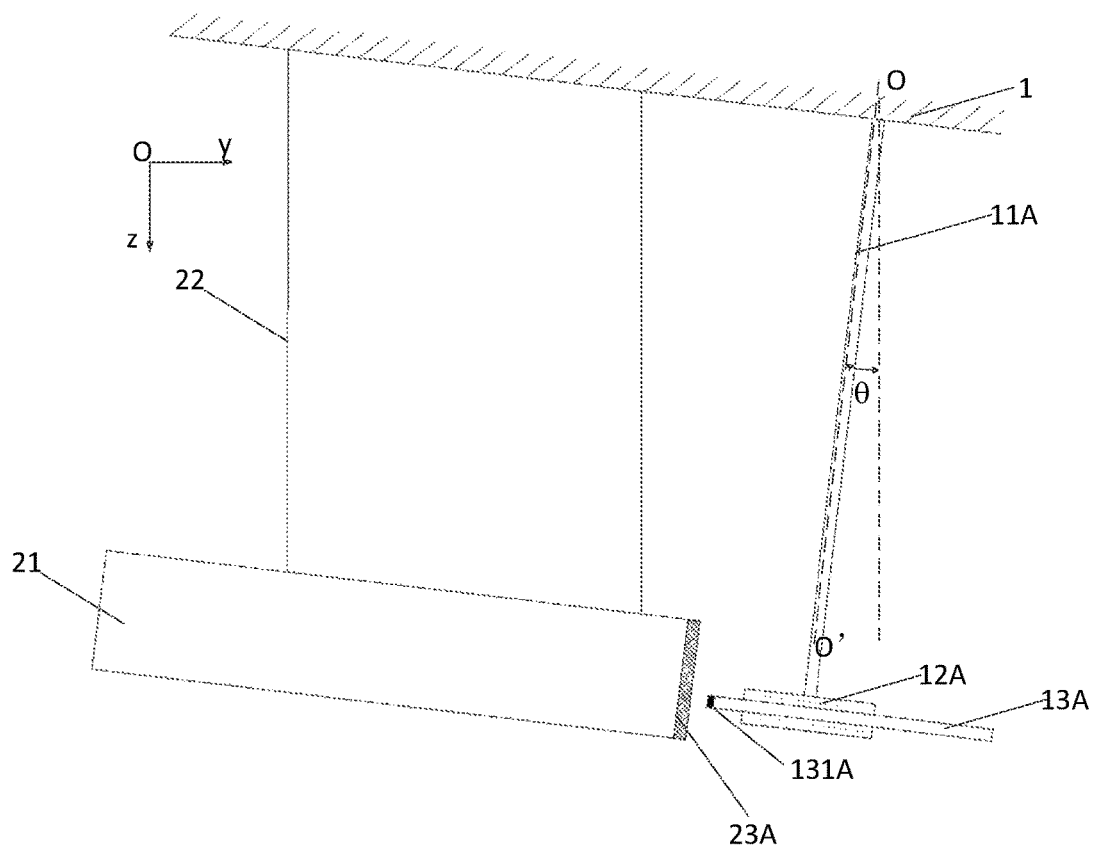
FIG. 2 is a front view of an Fabry-Perot sensor provided in embodiment 2 and 3 of the invention

$N_1$ flexible ropes are used to hang a horizontal rod, in which the distance between any two connecting points of flexible ropes connected to top plate is equal to the distance of these two ropes connected to horizontal rod and the said two ropes are equal in length, thereby two flexible ropes are permanently parallel. As shown in FIG. 1, when the top plate is arranged in level, four connecting points of any two of flexible ropes connected to top plate and horizontal rod form a rectangle which is a geometrically unstable system. And the first reflecting surface is perpendicular to the axis of the first fiber and the first Fabry-Perot cavity length is designated as $d_1$. As shown in FIG. 2, once the inclinometer tilts, four connecting points of any two of flexible ropes connected to top plate and horizontal rod constitute a parallelogram, which means the horizontal rod is always parallel to the top plate; however, the first connector will tilt as the tilting of the inclinometer and the first reflecting surface is still perpendicular to the axis of the first optic fiber, thus there is a change of the Fabry-Perot cavity length designated as $d_1'$.

Assume that the length of the flexible ropes for hanging horizontal rod is $l_1$ and the variation of the distance from fiber end face to the first reflecting surface is $\Delta d = d_1' - d_1$, the tilting angle of the detected object is $\theta_1$ and $$\theta_1 = \arcsin\frac{d_1' - d_1}{l_1},$$

when $\theta_1$ is extremely small, then $$\theta_1 = \arcsin\frac{d_1' - d_1}{l_1} = \frac{d_1' - d_1}{l_1}.$$

Optionally, $N_1$ holes can be provided at the top plate, then $N_1$ flexible ropes are inserted into $N_1$ holes and fixed.

Optionally, the cross section of said horizontal rod can be circular, triangular and diamond-shaped.

Preferably, $N_1=2$.

Preferably, two flexible ropes 22 are connected to the two ends of horizontal rod, respectively.

Preferably, the length of the flexible ropes for hanging the horizontal rod is $l_1$, the first Fabry-Perot cavity length is $d_1$ as the top plate horizontally placed; when the inclinometer has a tilt of $\theta_1$, the first Fabry-Perot cavity length is $d_1'$, then $$\theta_1 = \arcsin\frac{d_1' - d_1}{l_1}.$$

Preferably, the first connector 11A is a vertical rod rigidly connected to top plate 1.

As shown in FIG. 2, the inclinometer occurs counter-clockwise rotation as $\theta_1$ is positive, conversely, clockwise rotation.

The Fabry-Perot sensor provided in the present embodiment uses the advantage of high sensitivity of variation of interference in cavity length $d_1$ based on the EF-PI principle. The change of inclination angle can be detected by adopting a small variation of interference in the cavity length. The general idea is employing special suspended device, reflective device and packaging device to precisely measure the small angle in a certain direction of the detected object. The accuracy is extremely high in 0.001 seconds. Also, the monitoring can be realized in real time.

A Fabry-Perot sensor is provided in present invention in which the horizontal rod is connected to the top plate through several flexible ropes. In practical use, the inclinometer should be fixed on detected object and the top plate be in the level state; the horizontal rod will be in level position after installation and the first F-P cavity length is named as $d_1$. when the detected object tilts, the top plate and the first connector will also incline and the tilting angle of the first connector is the inclination of the detected construction. The horizontal rod is still parallel to the top plate, thus the first F-P cavity length will experience change designated as $d_1'$ and the variation of the first F-P cavity length is $\Delta d = d_1' - d_1$. Therefore, the Fabry-Perot principle can be employed to solve the variation of the cavity length and further to measure the inclination occurred on the first connector. The inclinometer based on Fabry-Perot principle has merits such as simple, convenient and easy to use for wide application.

When the detected object tilts, the horizontal rod provided with the reflecting surface as well as the optic fiber will permanently parallel to the top plate; thereby, the fiber is always perpendicular to the first reflecting surface disposed at the end of the horizontal rod. Thus no matter how large the inclination, it can be measured as long as the variation of the interference in cavity length is less than 2 mm. If the larger inclination is expected to be measured, the easiest approach is to shorten the length of flexible rope $l_1$. Since the length of flexible ropes $l_1$ is given and the fiber is always normal to the reflector no matter how large the inclination, the amount being precisely measured based on EF-PI is $\Delta d = d_1' - d_1$ and the accuracy of $\Delta d = d_1' - d_1$ can be greater than 1 nm to the upper limit of 0.1 nm. Taking the accuracy of 1 nm and the connector length $l_1$ of 0.1 m as an example, the accuracy of the angle is $\alpha = \arcsin(1 \text{ nm}/0.1 \text{ m}) = 0.00206''$, but the range is small as $\arcsin(1 \text{ mm}/0.1 \text{ m}) = 34.38'$. For the large scale detected object, the tilt is usually expressed and monitored in second, thus the above range is sufficient for the detected object. If the larger inclination is expected to be detected, the easiest approach is reduce $l_1$ such as $l_1$ being of 0.02 m, then the angle range is $\arcsin(1 \text{ mm}/0.02 \text{ m}) = 2.866°$; this kind of inclination in degree is very dangerous for detected object, thus the large angle range is not applied in general.

It is demonstrated that the temperature has extremely small effect on the measurement result of the present sensor, thus it can be neglected. For instance, for a sensor with l=10 cm and with the distance between the first reflecting end face and the first reflecting surface being 0.5 mm, the effect of temperature difference of 50° C. on the angle is only 0.028".

Embodiment 3

The present embodiment has some improvements on the basis of embodiment 1, the improved contents are as follows specifically:

said mass block 21 is a horizontal rod flexibly connected to the top plate 1 by $N_2$ rigid rods with equal length; the rigid rods also have flexible connection to the horizontal rod 21; when the inclinometer tilts, the rigid rods will permanently be in the vertical position;

also the distance between two connected points of any two rods connected to the top plate 1 is designated as the third distance; the distance between two connected points of said two rods connected to the horizontal rod is designated as the fourth distance; the third distance is equal to the fourth distance;

when the top plate 1 is arranged horizontally, the horizontal rod is also in horizontal position with the first reflecting surface 23A disposed vertically; Also the first reflecting surface 23A is perpendicular to the axis of the first fiber 13A. $N_2$ is an integral number greater than or equal to two.

Optionally, the cross section of said horizontal rod can be circular, triangular and diamond-shaped.

Preferably, $N_2 = 2$.

Preferably, two rigid rods are flexibly connected to the horizontal rod and top plate, respectively.

Preferably, the length of the rigid rods for hanging horizontal rod is $l_2$. The first Fabry-Perot cavity length is $d_2$ as the top plate positioned in horizontal state. When the top plate has an inclination of $\theta_2$, the first Fabry-Perot cavity length is $d_2'$ and $$\theta_2 = \arcsin\frac{d_2' - d_2}{l_2}.$$

Preferably, the first connector 11A is a vertical rod rigidly connected to the top plate 1.

Embodiment 4

A Fabry-Perot sensor provided in present embodiment, is comprised of a top plate 1, a mass block 21, the first connector 11A, the first optic fiber 13A, the second connector 11B and the second optic fiber 13B, wherein:

the mass block 21 is flexibly connected to the top plate 1; the first reflecting surface 23A and the second reflecting surface 23B are disposed at the two sides of the mass block, respectively; the first reflecting surface 23A and the second reflecting surface 23B have an angle $\alpha$ and $\alpha \neq 0°$; the top end of the first connector 11A is rigidly connected to the top plate 1 and bottom end is fixedly connected to the first optic fiber 13A; the end of the first fiber 13A disposed with the first reflecting end face 131A is directly facing to the first reflecting surface 23A; the first F-P cavity is formed between the first reflecting surface 23A and the first reflecting end face 131A; when the inclinometer has an inclination in the vertical plane formed by the first connector 11A and the first optic fiber 13A, the top plate 1 will slant with it and further drive the first connector 11A to have tilt, the first reflecting end face 131A will move and rotate, but the mass block 21 will maintain the original position and just has rotation, thus the first F-P cavity length will experience changes;

the top end of the second connector 11B is rigidly connected to the top plate 1 and the bottom end is fixedly connected to the second optic fiber 13B; the end of the second fiber 13B provided with the second reflecting surface 131B is directly facing to the second reflecting surface 23B; the second F-P cavity is formed between the second reflecting surface 23B and the second reflecting end face 131B; when the inclinometer tilts in the vertical plane formed by the second connector 11B and the second optic fiber 13B, the top plate 1 will slant with it and further followed by the inclination of the second connector; however, the mass block 21 will be in the original position and just has rotation, thus the second F-P cavity length will be changed.

Optionally, the first optic fiber 13A and the second optic fiber 13B can be single or multi-mode fiber.

Optionally, the first reflecting surface 23A and the second reflecting surface 23B can be replaced by reflector; said reflector is whole reflective or half reflective. Half reflective refers to the reflective rate is not close to one, such as one third.

Optionally, the first optic fiber 13A is connected to the first connector 11A through the first fiber housing 12A disposed at the periphery of the first fiber; the second optic fiber 13B is connected to the second connector 12B through the second fiber housing 12B provided at the periphery of the second fiber.

Preferably, the mass block 21 is a regular column with polygon cross section; the first reflecting surface 23A and the second reflecting surface 23B is located at two sides of the column, respectively, the upper surface of the column is connected to the top plate 1 by $N_5$ flexible ropes 22 in equal length and their connecting points are not in a straight line; and the four connecting points of any two flexible ropes 22 connected to top plate 1 and connected to the regular column constitute a parallelogram; the center of gravity of the regular column is in the envelop range of the intersection of $N_5$ flexible ropes 22 with equal length and the regular column, wherein $N_5$ is an integral number greater than or equal to three;

when the top plate 1 is horizontally placed, the top surface of the regular column is also in a horizontal position with the first reflecting surface 23A arranged vertically; also the first reflecting surface 23A is perpendicular to the axis of the fiber 13A; the second reflecting surface 23B is also in vertical position and is perpendicular to the axis of the second fiber 13B.

Preferably, $N_5$=3 and $\alpha$=90°, the three connecting points of flexible ropes 22 connected to the top plate 21 form a right triangle with two right angle sides parallel to the first 23A and the second 23B reflecting surface, respectively; when the top plate 1 is horizontally placed, the first 23A and the second 23B reflecting surface are normal to the horizontal plane.

Three flexible ropes are adopted for hanging a mass block and the intersections of the three flexible ropes connected to the top plate are not in a straight line. The center of gravity of the regular column being in the range of the three flexible ropes with equal length prevents the shaking of the horizontal rod whenever at least three flexible ropes exerts forces on horizontal rod; namely, the first and second reflecting surface are ensured to be perpendicular to the axis of the first and second optic fiber, respectively.

Preferably, the mass block 21 is a regular column with polygon cross section; the first reflecting surface 23A and the second reflecting surface 23B is located in two sides of the regular column, respectively; the upper surface of the column is flexibly connected to the top plate 1 by $N_6$ rigid rods with equal length and bottom surface has a flexible connection with the mass block 21; thus when the inclinometer has inclination, the rigid rods will always in vertical position;

the connecting points of the $N_6$ rigid rods and the top plate 1 are not in a straight line; and the four connecting points of any two rigid rods connected to top plate 1 and connected to the upper surface of column constitute a parallelogram, in which $N_6$ is an integral number greater than or equal to three.

when the top plate 1 is horizontally placed, the top surface of the regular column is also in a horizontal position with the first reflecting surface 23A arranged vertically; also the first reflecting surface 23A is perpendicular to the axis of the optic fiber 13A; the second reflecting surface 23B is also in vertical position and is perpendicular to the axis of the second fiber 13B.

Preferably, $N_5$=3, and $\alpha$=90°; the three connecting points of rigid rods connected to the mass block 21 form a right triangle with two right angle sides parallel to the first 23A and the second 23B reflecting surface, respectively; when the top plate 1 is horizontally placed, the first 23A and the second 23B reflecting surface are normal to the horizontal plane.

Preferably, both the first connector 11A and the second connector 11B are vertical rods rigidly connected to the top plate 1.

Preferably, the mass block 21 is a cuboid with $N_5$=4, and four flexible ropes or four rigid rods in equal length are flexibly connected to the four vertices of the upper surface of the cuboid.

Figure 3:
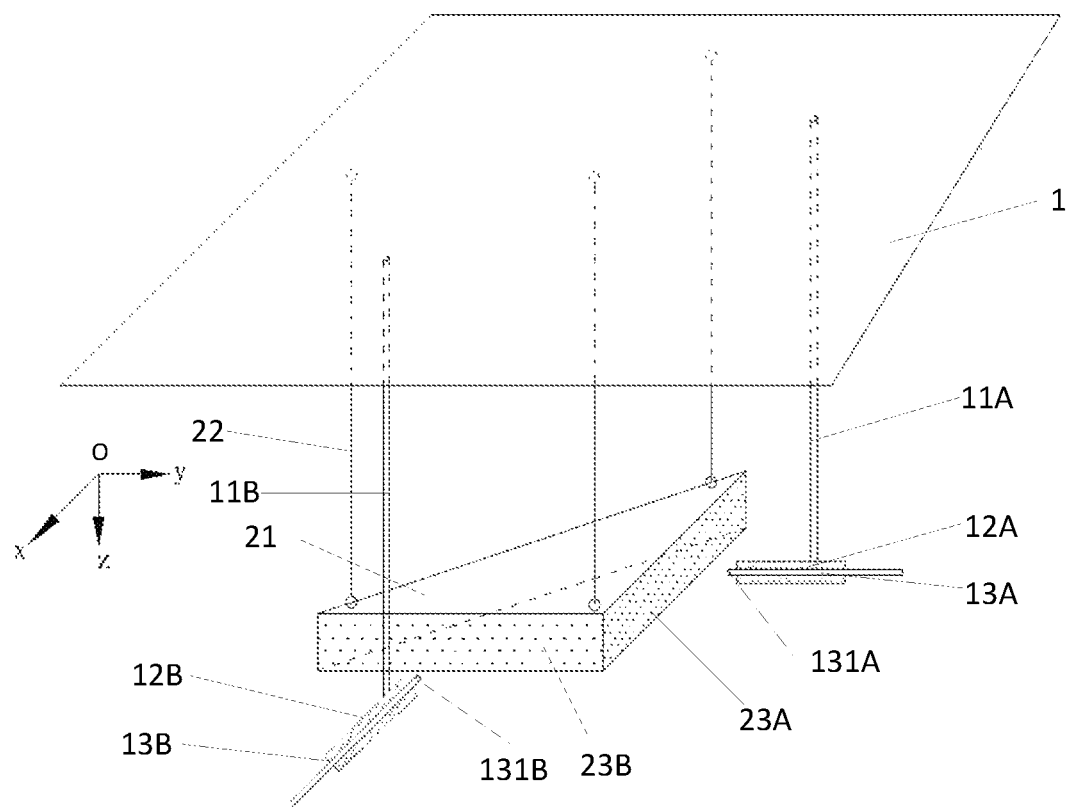
FIG. 3 is a stereogram of an Fabry-Perot sensor provided in embodiment 4 and 5 of the invention
Figure 4:
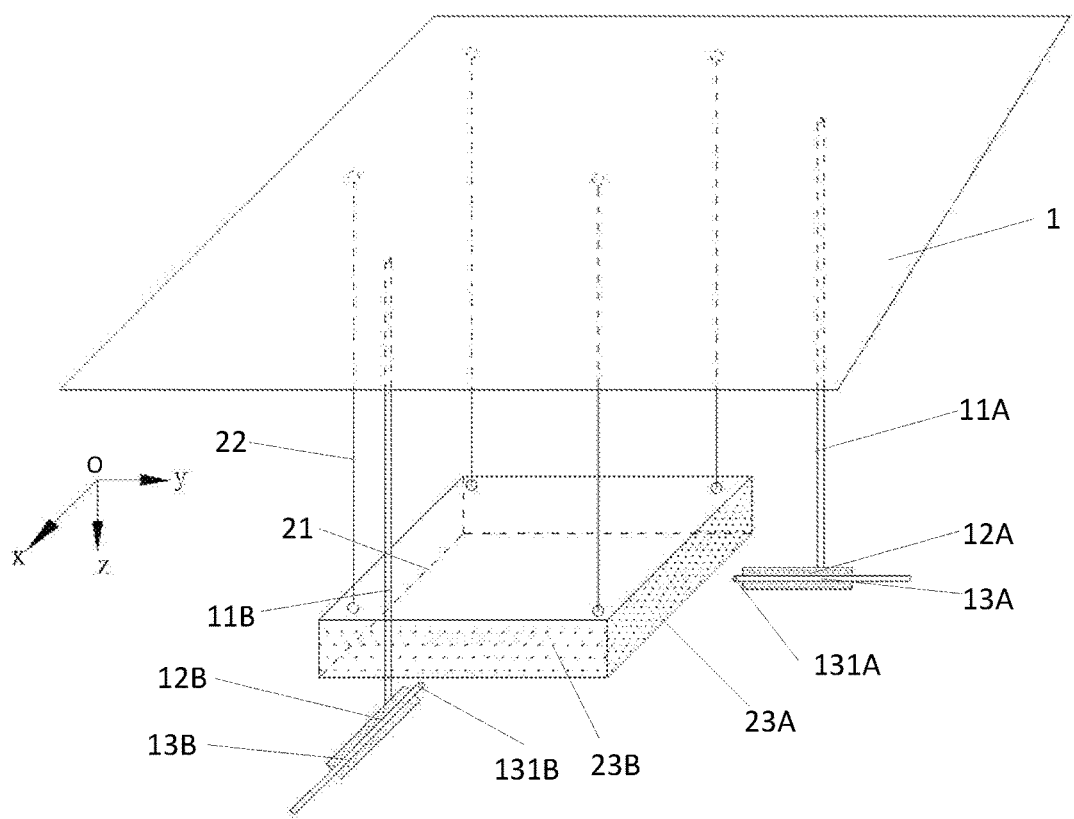
FIG. 4 is a stereogram of an Fabry-Perot sensor provided in embodiment 4 and 5 of the invention

The working principle of the Fabry-Perot sensor provided in the present embodiment is described as follows:

The distance between any two connecting points of flexible ropes connected to top plate is equal to the distance of these two ropes connected to horizontal rod and theses two ropes are equal in length, thereby two flexible ropes are permanently parallel. As shown in FIG. 3 and FIG. 4, when the top plate is arranged in level, four connecting points of any two of flexible ropes connected to top plate and horizontal rod form a rectangle which is a geometrically unstable system. And the first and second reflecting surface is perpendicular to the axis of the first fiber and the second fiber, respectively. The first and second Fabry-Perot cavity length are designated as $d_5$ and $d_6$, respectively. once the inclinometer tilts, four connecting points of any two of flexible ropes connected to top plate and horizontal rod constitute a parallelogram, which means the horizontal rod is always parallel to the top plate; however, the first connector will tilt as the tilting of the inclinometer and the first reflecting surface is still perpendicular to the axis of the first optic fiber, thus there is a change of the first Fabry-Perot cavity length designated as $d_5$' and the second Fabry-Perot cavity length is changed to $d_6$'.

Assume that the length of the flexible ropes for hanging horizontal rod is $l_5$, the variation of the first and the second Fabry-Perot cavity length is $d_5'-d_5$ and $d_6'-d_6$ respectively. The intersection angle of the inclinometer in YOZ plane and XOZ plane relative to axis OZ is $\theta_5$ and $\theta_6$, respectively, then $$\theta_5 = \arcsin\frac{d_5' - d_5}{l_5}$$

and $$\theta_6 = \arcsin\frac{d_6' - d_6}{l_6};$$

when $\theta_5$ and $\theta_6$ are extremely small, then $$\theta_5 = \arcsin\frac{d_5' - d_5}{l_5} \approx \frac{d_5' - d_5}{l_5}$$

and $$\theta_6 = \arcsin\frac{d_6' - d_6}{l_6} \approx \frac{d_6' - d_6}{l_6}.$$

The Fabry-Perot sensor provided in present embodiment can be located in a sealed container with liquid filled in the whole container as a damp to eliminate the disturbance from the structure vibration.

The Fabry-Perot sensor provided in present embodiment can be located in a sealed container with a liquid damper disposed at the bottom of the mass block to eliminate the effect from the structure vibration on the mass block.

Embodiment 5

Figure 5:
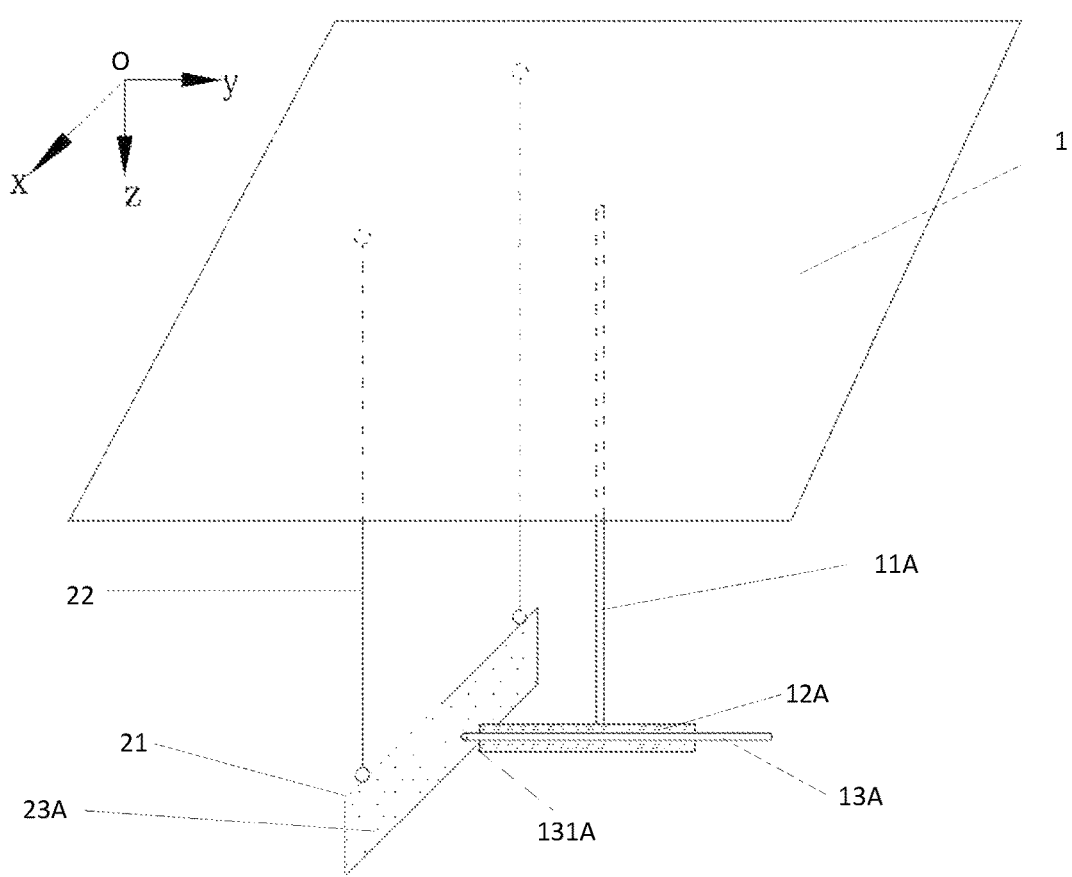
FIG. 5 is a front view of an Fabry-Perot sensor provided in embodiment 6 of the invention

The present embodiment has some improvements on the basis of embodiment 1, as shown in FIG. 5, the improved contents are as follows specifically:

said mass block 21 is a thin slice connected to the top plate by $N_3$ flexible ropes 22 in equal length. The first reflecting surface 23A is provided at one side of the thin slice; when the top plate 1 is arranged horizontally, the first reflecting surface 23A is in vertical position and is perpendicular to the axis of the first optic fiber 13A; the center of gravity of the thin slice is in the envelop range of $N_3$ flexible ropes 22 with equivalent length and $N_3$ is an integral number greater than or equal to two.

The thin slice can adopt reflective or half reflective materials such as metal, silicon or glass; silicon slice is half reflective with part light transmission and part light reflection. It should be placed vertically and can install the balance weight at its bottom to ensure the thin slice keeps in a vertical plane.

The center of gravity of the thin slice being in the range of several flexible ropes prevents the shaking of the thin slice whenever the flexible ropes exerts forces on this slice, namely, the first reflecting surface will always directly face to the first reflecting end face.

The working principle of the Fabry-Perot sensor provided in the present embodiment is described as follows:

When the inclinometer provided in present embodiment is placed in level, the first Fabry-Perot cavity length is designated as $d_3$. When the inclinometer has an inclination of $\theta_3$, the first Fabry-Perot cavity length is changed into $d_3'$. Assume that the distance from the end of the first optic fiber to the top plate is $l_3$ the variation of the distance from fiber end face to thin slice is $\Delta d = d_3' - d_3$. Then the tilting angle of the detected object is $\theta_3$ and $$\theta_3 = \arctan\frac{d_3' - d_3}{l_3};$$

when $\theta_3$ is extremely small, $$\theta_3 = \arctan\frac{d_3' - d_3}{l_3} \approx \frac{d_3' - d_3}{l_3}.$$

Preferably, $N_3=2$.

Preferably, two ends of thin slice are connected to the top plate 1 by two flexible ropes 22 with equal length.

Preferably, the first connector 11A is a vertical rod rigidly connected to the top plate 1.

Preferably, the length of $N_3$ flexible ropes 22 is equal.

Preferably, the distance from the first fiber end 13A to the top plate 1 is $l_3$, the first Fabry-Perot cavity length is $d_3$ as the top plate is horizontally placed; when the inclinometer has a tilt of $\theta_3$, the first Fabry-Perot cavity length is $d_3'$, then $$\theta_3 = \arctan\frac{d_3' - d_3}{l_3}.$$

Embodiment 6

The present embodiment has some improvements on the basis of embodiment 1, as shown in FIG. 5, the improved contents are as follows specifically:

the mass block is a thin slice with its top flexibly connected to the top plate 1 by using $N_4$ rigid rods with equal length; the rigid rods are also flexibly jointed the thin slice; when the inclinometer tilts, the rigid rods will be permanently in the vertical position;

the first reflecting surface 23A is disposed at one side of the thin slice; when the top plate 1 is horizontally placed, the first reflecting surface 23A is in vertical position and is perpendicular to the axis of the first optic fiber 13A; $N_4$ is an integral number greater than or equal to two.

Preferably, $N_4=2$.

Preferably, two ends of thin slice are flexibly connected to the top plate 1 by two rigid rods with equal length.

Preferably, the first connector 11A is a vertical rod rigidly connected to the top plate 1.

Preferably, the length of $N_4$ flexible ropes 22 is equal.

Preferably, the distance from the first fiber end 13A to the top plate 1 is $l_4$, the first Fabry-Perot cavity length is $d_4$ as the top plate is horizontally placed; when the inclinometer has a tilt of $\theta_4$, the first Fabry-Perot cavity length is $d_4'$, then $$\theta_4 = \arctan\frac{d_4' - d_4}{l_4}.$$

Embodiment 7

The present embodiment has some improvements on the basis of embodiment 1, the improved contents are as follows specifically:

The mass block 21 is a horizontal rod connected to the top plate 1 by $N_5$ flexible ropes 22 with equal length;

the distance between two connected points of any two flexible ropes connected to the top plate 1 is designated as the fifth distance; the distance between two connected points of said two flexible ropes connected to the horizontal rod is designated as the sixth distance; the fifth distance is equal to the sixth distance;

the first reflecting surface 23A is located at the upper surface of the horizontal rod; when the top plate 1 is in horizontal position, the horizontal rod is also in level condition and the first reflecting surface 23A is aligned in level direction; the center of mass of the horizontal rod is in the envelop range of $N_5$ flexible ropes 22 with equivalent length; also the first reflecting surface 23A is perpendicular to the axis of the first optic fiber 13A; $N_5$ is an integral number greater than or equal to two.

The center of gravity of the horizontal rod being in the range of $N_5$ flexible ropes prevents the shaking of the horizontal rod whenever the flexible ropes exerts forces on horizontal rod, namely, the first reflecting surface will always directly face to the first reflecting end face.

Figure 6:
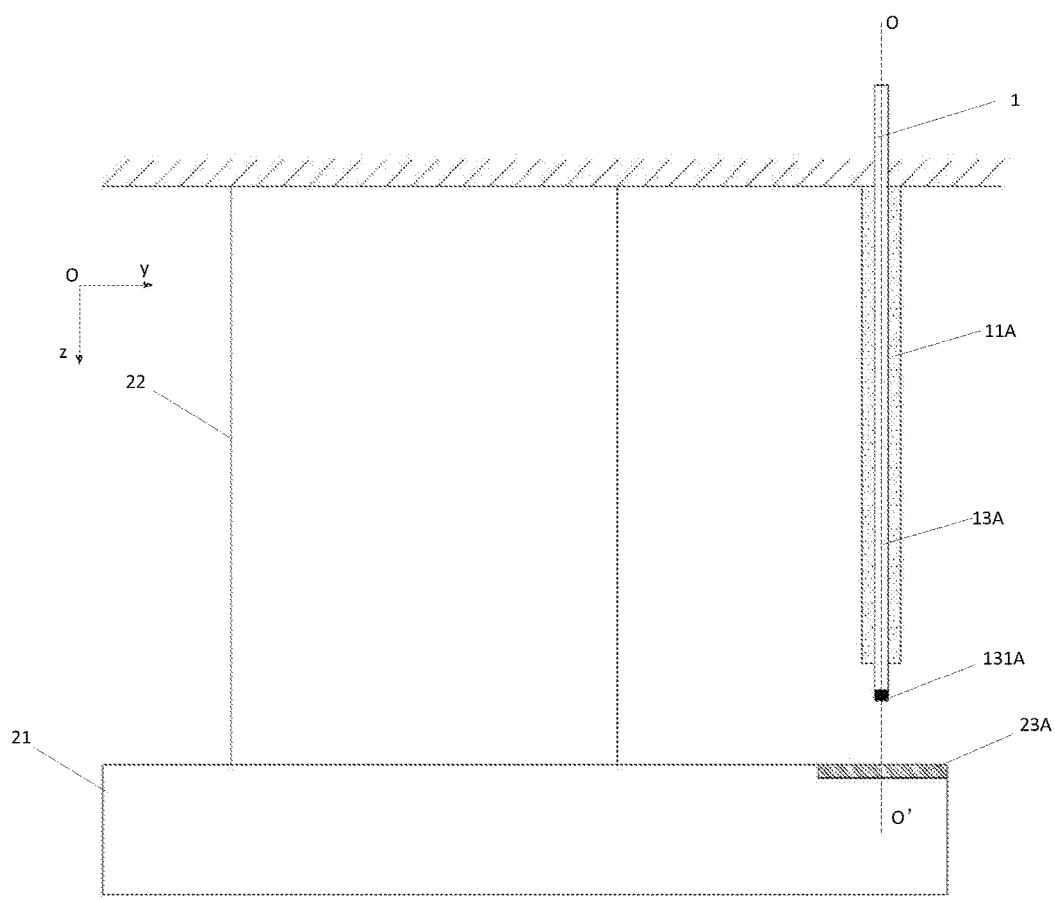
FIG. 6 is a front view of an Fabry-Perot sensor provided in embodiment 7 of the invention

In practical use, the inclinometer should be fixed on the detected object and the top plate needs to be in horizontal position. As shown in FIG. 6, taking point O as the center of plane YOZ, the inclinometer can measure the rotation of detected object in YOZ plane relative to point O.

Figure 7:
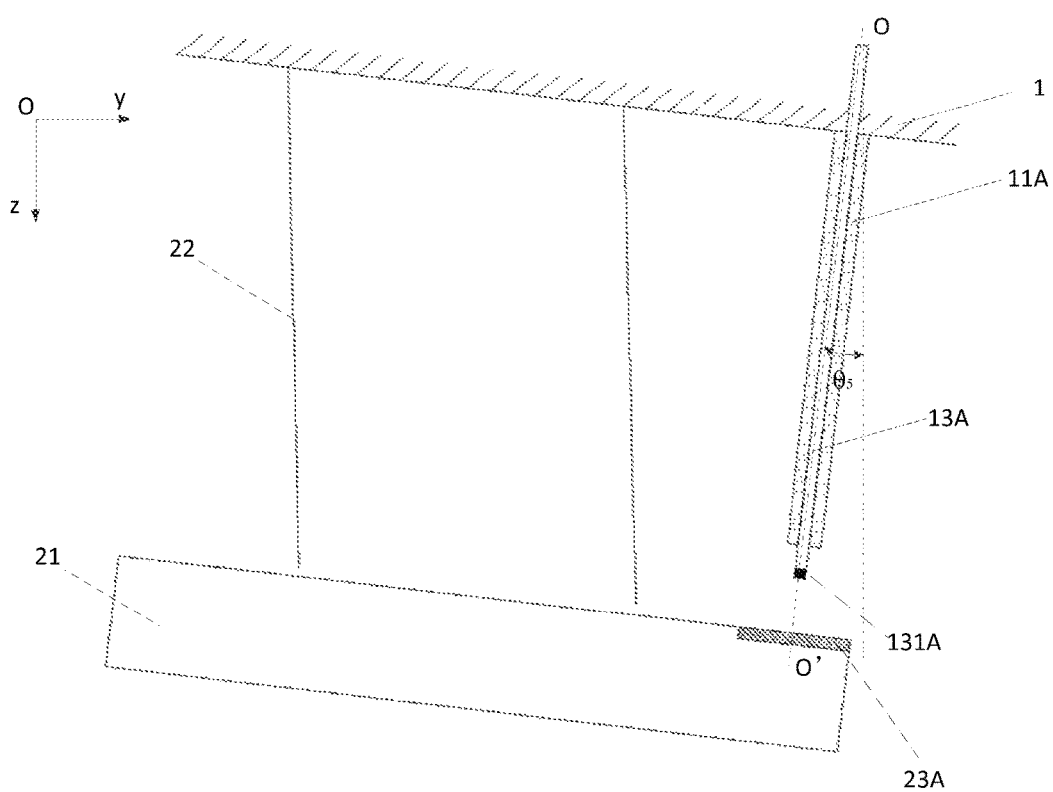
FIG. 7 is a front view of an Fabry-Perot sensor provided in embodiment 8 of the invention
Figure 8:
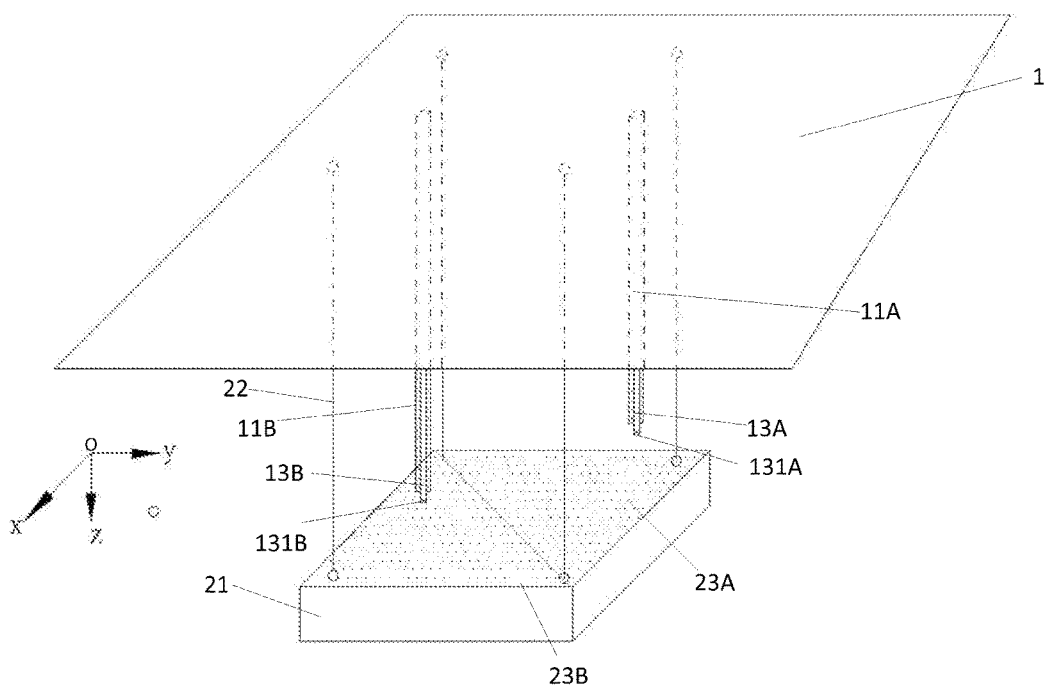
FIG. 8 is a front view of an Fabry-Perot sensor provided in embodiment 9 and 10 of the invention wherein: 1 is top plate, 11A is the first connector, 11B is the second connector, 12A is the first optic fiber housing, 12B is the second optic fiber housing, 13A is the first optic fiber, 13B is the second optic fiber, 131A is the first reflecting end face, 131B is the second reflecting end face, 21 is mass block, 22 is flexible ropes, 23A is the first reflecting surface, 23B is the second reflecting surface.

The working principle of the Fabry-Perot sensor provided in the present embodiment is described as follows:

$N_5$ flexible ropes are used to hang a horizontal rod, in which the distance between any two connecting points of flexible ropes connected to top plate is equal to the distance of these two ropes connected to horizontal rod and these two ropes are equal in length, thereby two flexible ropes are permanently parallel. As shown in FIG. 6, when the top plate is arranged in level, four connecting points of any two of flexible ropes connected to top plate and horizontal rod form a rectangle which is a geometrically unstable system. And the first reflecting surface is perpendicular to the axis of the first fiber and the first Fabry-Perot cavity length is designated as $d_5$. As shown in FIG. 7, once the inclinometer tilts, four connecting points of any two of flexible ropes connected to top plate and horizontal rod constitute a parallelogram, which means the horizontal rod is always parallel to the top plate; however, the first connector will tilt as the tilting of the inclinometer and the first reflecting surface is still perpendicular to the axis of the first optic fiber, thus there is a change of the Fabry-Perot cavity length designated as $d_5'$. Assume that the length of flexible ropes is $l_5$ as the top plate is in level state, the variation of the distance from fiber end face to the first reflecting surface is $\Delta d=d_5'-d_5$; then the absolute value of the tilting angle $\theta_5$ of the objected object is $$|\theta_5| = \arccos\left(1 - \frac{d_5 - d_5'}{l_5}\right).$$

Preferably, $N_5=2$.

Preferably, two flexible ropes are connected to the horizontal rod 21 and the top plate 1, respectively.

Preferably, the first connector 11A is a vertical rod rigidly connected to the top plate 1.

Embodiment 8

The present embodiment has some improvements on the basis of embodiment 1, the improved contents are as follows specifically:

the mass block 21 is a horizontal rod flexibly connected to the top plate by $N_6$ rigid rods in equal length; the rigid rods also have the flexible connection with the horizontal rod. When the inclinometer tilts, the rigid rods will permanently be in a vertical condition;

also the distance between two connected points of any two rods connected to the top plate 1 is designated as the third distance; the distance between two connected points of said two rods connected to the horizontal rod is designated as the fourth distance; the third distance is equal to the fourth distance;

the first reflecting surface 23A is located at the upper surface of the horizontal rod. When the top plate is in horizontal position, the horizontal rod is also in level condition and the first reflecting surface 23A is parallel with the horizontal plane; also the first reflecting surface 23A is perpendicular to the axis of the first optic fiber 13A. $N_6$ is an integral number greater than or equal to two.

Preferably, $N_6=2$.

Preferably, two rigid rods are flexibly connected to the two ends of horizontal rod 21 and top plate 1, respectively.

Preferably, the first connector 11A is a vertical rod rigidly connected to the top plate 1.

Embodiment 9

The present embodiment has some improvements on the basis of embodiment 4, the improved contents are as follows specifically:

The mass block 21 is a regular column with polygon cross section; the first reflecting surface 23A and the second reflecting surface 23B is disposed at the top surface of the regular column; the upper surface of the column is connected to the top plate 1 by $N_7$ flexible ropes 22 in equal length and their connecting points are not in a straight line; and the four connecting points of any two flexible ropes 22 connected to top plate 1 and connected to the regular column form a parallelogram; the center of mass of the column is in the envelop range of the intersection of $N_7$ flexible ropes 22 with equal length and regular column, wherein $N_7$ is an integral number greater or equal to three;

when the top plate 1 is placed horizontally, the top surface of the regular column is also in a horizontal position with the first reflecting surface 23A arranged in level; also the first reflecting surface 23A is perpendicular to the axis of the first optic fiber 13A; the second reflecting surface 23B is also in horizontal position and is perpendicular to the axis of the second optic fiber 13B.

Preferably, both the first connector 11A and the second connector 11B are vertical rods rigidly connected to the top plate 1.

Embodiment 10

The present embodiment has some improvements on the basis of embodiment 5, the improved contents are as follows specifically:

the mass block 21 is a regular column with polygon cross section; the first reflecting surface 23A and the second reflecting surface 23B are provided at the upper surface; the upper surface of the column is flexibly connected to the top plate 1 by $N_8$ rigid rods in equal length and the rigid rods is also flexibly jointed the mass block 21; thus when the inclinometer has inclination, the rigid rods will permanently keep a vertical position. And Ng is a integral number greater than or equal to three;

when the top plate 1 is disposed horizontally, the top surface of the regular column is also in a horizontal position with the first reflecting surface 23A arranged in level; also the first reflecting surface 23A is perpendicular to the axis of the first optic fiber 13A; the second reflecting surface 23B is also in horizontal position and is perpendicular to the axis of the second optic fiber 13B.

Preferably, both the first connector 11A and the second connector 11B are vertical rods rigidly connected to the top plate 1.

Obviously, the above said embodiments are only the examples for clearly illustrating the present sensor, not the limit to the embodiments. For those of ordinary skill in the art, the variations in different styles can be made on the basis of the said illustration. Herein, it is not necessary to describe all of the embodiments. However, the obvious variations extended from the present illustration are also been protected in this invention.

The invention claimed is:

1. An inclinometer having a Fabry-Perot(F-P) sensor, comprising a top plate, a mass block, a first connector and a first optic fiber, wherein the top of said mass block is flexibly connected to the top plate with a plurality of flexible ropes and a first reflecting surface is disposed at one side of the mass block;

one end of the first connector is rigidly connected to the top plate and the other end is fixedly connected to the first optic fiber; an end of the first optic fiber provided with a first reflecting end face is directly facing towards the first reflecting surface forming a first F-P cavity between the first reflecting surface and the first reflecting end face, when the inclinometer has an inclination, the top plate slants with the inclinometer and further drives the first connector to have a tilt, and the first reflecting end face to move and rotate, but the plurality of flexible ropes remain permanently parallel, wherein the first F-P cavity length changes.

2. The inclinometer having a Fabry-Perot(F-P) sensor according to claim 1, wherein said mass block is a horizontal rod connected to the top plate by the plurality of flexible ropes with equal length;
the distance between two connected points of any two of the plurality of flexible ropes connected to the top plate is designated as the first distance; the distance between two connected points of the two flexible ropes connected to the horizontal rod is designated as the second distance; the first distance is equal to the second distance;
when the top plate is horizontally placed, the horizontal rod is also in horizontal position with the first reflecting surface arranged vertically; the center of gravity of the horizontal rod is in an envelop range of the plurality of flexible ropes with equivalent length; where the first reflecting surface is perpendicular to the axis of the first optic fiber.

3. The inclinometer having a Fabry-Perot(F-P) sensor according to claim 2, wherein the plurality of flexible ropes are two flexible ropes.

4. The inclinometer having a Fabry-Perot(F-P) sensor according to claim 2, wherein the first connector is a vertical rod rigidly connected to the top plate.

5. The inclinometer having a Fabry-Perot(F-P) sensor according to claim 1, further comprising a second connector and a second optic fiber, wherein
a second reflecting surface is disposed at a second side of the mass block; the first reflecting surface and the second reflecting surface have an angle $\alpha$ and $\alpha \neq 0°$;
a top end of the second connector is rigidly connected to the top plate and a bottom end is fixedly connected to the second optic fiber; a first end of the second optic fiber is provided with a second reflecting end face; the first end of the second optic fiber is directly facing the second reflecting surface; a second F-P cavity is formed between the second reflecting surface and the second reflecting end face; when the inclinometer tilts in the vertical plane formed by the second connector and the second optic fiber, the top plate will slant with the inclinometer and further followed by the inclination of the second connector changing the second F-P cavity length.

6. The inclinometer having a Fabry-Perot(F-P) sensor according to claim 5, wherein the mass block is a regular column with polygon cross section; the first reflecting surface and the second reflecting surface are located at two sides of the column, respectively, the upper surface of the column is connected to the top plate by $N_5$ flexible ropes in equal length and their connecting points are not in a straight line; and the four connecting points of any two flexible ropes connected to top plate and connected to the regular column constitute a parallelogram; the center of gravity of the regular column is in an envelop range of the intersection of $N_5$ flexible ropes with equal length and the regular column, wherein $N_5$ is an integral number greater or equal to three;
when the top plate is horizontally placed, the top surface of the regular column is also in a horizontal position with the first reflecting surface arranged vertically; also the first reflecting surface is perpendicular to the axis of the first optic fiber; the second reflecting surface is also in vertical position and is perpendicular to the axis of the second optic fiber.

7. The inclinometer having a Fabry-Perot(F-P) sensor according to claim 6, wherein said $N_5$=3 and $\alpha$=90°, the three connecting points of flexible ropes connected to the top plate form a right triangle with two right angle sides parallel to the first and the second reflecting surface, respectively; when the top plate is horizontally placed, the first and the second reflecting surface are normal to the horizontal plane.

8. The inclinometer having a Fabry-Perot(F-P) sensor according to claim 5, wherein the mass block is a regular column with polygon cross section; the first reflecting surface and the second reflecting surface is disposed at the top surface of the regular column; the upper surface of the column is connected to the top plate by $N_7$ flexible ropes in equal length and their connecting points are not in a straight line; and the four connecting points of any two flexible ropes connected to top plate and connected to the regular column form a parallelogram; the center of gravity of the column is in an envelop range of the intersection of $N_7$ flexible ropes with equal length and regular column, wherein $N_7$ is an integral number greater or equal to three;
when the top plate is placed horizontally, the top surface of the regular column is also in a horizontal position with the first reflecting surface arranged in level; also the first reflecting surface is perpendicular to the axis of the fiber; the second reflecting surface is also in horizontal position and is perpendicular to the axis of the second fiber.

9. The inclinometer having a Fabry-Perot(F-P) sensor according to claim 1, wherein said mass block is a thin slice connected to the top plate by $N_3$ flexible ropes in equal length; the first reflecting surface is provided at one side of the thin slice; when the top plate is arranged horizontally, the first reflecting surface is in vertical position and is perpendicular to the first axis; the center of gravity of the thin slice is in the envelop range of $N_3$ flexible ropes with equivalent length and $N_3$ is an integral number greater than or equal to two.

10. The inclinometer having a Fabry-Perot(F-P) sensor according to claim 9, wherein said $N_3$=2 and two ends of the thin slice are connected to the top plate by two flexible ropes with equal length.

11. The inclinometer having a Fabry-Perot(F-P) sensor according to claim 1, wherein the mass block is a horizontal rod connected to the top plate by $N_5$ flexible ropes with equal length;
the distance between two connected points of any two flexible ropes connected to the top plate is designated as the fifth distance; the distance between two connected points of said two flexible ropes connected to the horizontal rod is designated as the sixth distance; the fifth distance is equal to the sixth distance;
the first reflecting surface is located at the upper surface of the horizontal rod; when the top plate is in horizontal position, the horizontal rod is also in level condition and the first reflecting surface is aligned in level direction; the center of gravity of the horizontal rod is in an envelop range of $N_5$ flexible ropes with equivalent length; also the first reflecting surface is perpendicular to the first axis of the first optic fiber; $N_5$ is an integral number greater than or equal to two.

12. The inclinometer having a Fabry-Perot(F-P) sensor according to claim 11, wherein said $N_s=2$ and two flexible ropes have equal length; the distance between two connected points of two flexible ropes connected to the top plate is designated as the fifth distance; the distance between two connected points of said two flexible ropes connected to the horizontal rod is designated as the sixth distance; the fifth distance is equal to the sixth distance.

13. The inclinometer having a Fabry-Perot(F-P) sensor according to claim 12, wherein said the first connector is a vertical rod rigidly connected to the top plate.

\* \* \* \* \*